(12) United States Patent
Wirola et al.

(10) Patent No.: US 11,221,389 B2
(45) Date of Patent: Jan. 11, 2022

(54) STATISTICAL ANALYSIS OF MISMATCHES FOR SPOOFING DETECTION

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: Here Global B.V., Eindhoven (NL)

( * ) Notice: Subject to any disclaimer, the term of this patent is extended or adjusted under 35 U.S.C. 154(b) by 0 days.

(21) Appl. No.: 16/723,572

(22) Filed: Dec. 20, 2019

(65) Prior Publication Data

US 2020/0200857 A1 Jun. 25, 2020

(30) Foreign Application Priority Data

Dec. 20, 2018 (EP) .................................. 18214720

(51) Int. Cl.
| | | |
|---|---|---|
| *G01S 5/02* | (2010.01) | |
| *H04W 4/029* | (2018.01) | |
| *H04B 17/318* | (2015.01) | |
| *G01S 19/01* | (2010.01) | |

(52) U.S. Cl.
CPC .......... *G01S 5/0242* (2013.01); *G01S 5/0252* (2013.01); *H04B 17/318* (2015.01); *H04W 4/029* (2018.02); *G01S 19/015* (2013.01)

(58) Field of Classification Search
CPC ......... H04W 4/029; H04W 4/33; H04W 4/02; H04W 4/30; H04W 64/00; H04W 4/80; H04W 12/1202; H04W 4/023; H04W 64/003; H04W 12/00503; H04W 12/12; H04W 16/20; H04W 24/00; H04W 4/38; H04W 12/63; H04W 12/104; H04W 12/79; G01S 5/0242; G01S 5/0252; G01S 19/015; G01S 19/21; G01S 19/215; H04B 17/318

See application file for complete search history.

(56) References Cited

U.S. PATENT DOCUMENTS

| | | | |
|---|---|---|---|
| 6,448,925 | B1 | 9/2002 | Shridhara |
| 6,501,956 | B1 | 12/2002 | Weeren et al. |
| 7,305,232 | B2 | 12/2007 | Ono et al. |
| 7,312,752 | B2 | 12/2007 | Smith et al. |
| 7,574,202 | B1 | 8/2009 | Tsao et al. |

(Continued)

FOREIGN PATENT DOCUMENTS

| | | |
|---|---|---|
| CN | 106597363 A | 4/2017 |
| EP | 2 746 813 A1 | 6/2014 |

(Continued)

OTHER PUBLICATIONS

Office Action for U.S. Appl. No. 16/723,802 dated May 18, 2020.

(Continued)

*Primary Examiner* — Daniel Lai
(74) *Attorney, Agent, or Firm* — Alston & Bird LLP

(57) ABSTRACT

A method is disclosed that includes obtaining one or more pieces of radio measurements; determining one or more radio nodes that enable one or more mobile devices a respective positioning; and maintaining a database comprising information identifying the determined one or more radio nodes. A corresponding apparatus, computer-readable storage medium and system are also disclosed.

20 Claims, 7 Drawing Sheets

(56) References Cited

U.S. PATENT DOCUMENTS

| | | | |
|---|---|---|---|
| 7,716,740 B2 | 5/2010 | Robert et al. | |
| 7,788,382 B1 | 8/2010 | Jones et al. | |
| 7,859,462 B2 | 12/2010 | Small | |
| 7,970,894 B1 | 6/2011 | Patwardhan | |
| 8,571,578 B1* | 10/2013 | Chen | G01S 5/0009 455/456.1 |
| 8,655,312 B2 | 2/2014 | Stahlberg et al. | |
| 8,750,267 B2 | 6/2014 | Aggarwal et al. | |
| 8,805,403 B2 | 8/2014 | Curticapean et al. | |
| 9,113,291 B2 | 8/2015 | Venkatraman et al. | |
| 9,167,386 B2 | 10/2015 | Valaee et al. | |
| 9,258,713 B2 | 2/2016 | Rangarajan et al. | |
| 9,301,100 B1 | 3/2016 | Jampani et al. | |
| 9,374,709 B2 | 6/2016 | Peirce et al. | |
| 9,420,430 B2 | 8/2016 | Wuoti et al. | |
| 9,466,881 B1 | 10/2016 | Berry et al. | |
| 9,503,864 B1 | 11/2016 | Chao et al. | |
| 9,544,798 B1 | 1/2017 | Ahmadzadeh et al. | |
| 9,794,753 B1 | 10/2017 | Stitt et al. | |
| 9,849,978 B1 | 12/2017 | Carmack et al. | |
| 9,867,039 B2 | 1/2018 | Wang et al. | |
| 9,886,850 B2 | 2/2018 | Benhammou | |
| 10,149,159 B1 | 12/2018 | Perfitt | |
| 10,511,392 B2 | 12/2019 | Khalajmehrabadi et al. | |
| 10,530,486 B2 | 1/2020 | Aoyama et al. | |
| 10,531,423 B1 | 1/2020 | Hassan et al. | |
| 2006/0240840 A1 | 10/2006 | Morgan et al. | |
| 2007/0049323 A1 | 3/2007 | Wang et al. | |
| 2009/0088132 A1 | 4/2009 | Politowicz | |
| 2010/0120422 A1* | 5/2010 | Cheung | G01S 5/0236 455/434 |
| 2011/0009132 A1 | 1/2011 | Skarby et al. | |
| 2011/0065450 A1 | 3/2011 | Kazmi | |
| 2011/0131651 A1 | 6/2011 | Shanmugavadivel et al. | |
| 2012/0056785 A1 | 3/2012 | Jovicic et al. | |
| 2013/0170378 A1 | 7/2013 | Ray et al. | |
| 2013/0196684 A1* | 8/2013 | Dong | H04W 4/33 455/456.1 |
| 2013/0252631 A1 | 9/2013 | Alizadeh-Shabdiz et al. | |
| 2013/0303185 A1 | 11/2013 | Kim et al. | |
| 2013/0310066 A1 | 11/2013 | Shu et al. | |
| 2013/0310068 A1* | 11/2013 | Fischer | G01S 19/05 455/456.1 |
| 2013/0336138 A1 | 12/2013 | Venkatraman et al. | |
| 2014/0130155 A1* | 5/2014 | An | H04W 12/122 726/22 |
| 2014/0150049 A1 | 5/2014 | Kwon et al. | |
| 2014/0256348 A1 | 9/2014 | Wirola et al. | |
| 2014/0344946 A1 | 11/2014 | Ward et al. | |
| 2015/0050947 A1 | 2/2015 | Wirola et al. | |
| 2015/0065166 A1 | 3/2015 | Ward et al. | |
| 2015/0172289 A1* | 6/2015 | Kwon | H04W 12/12 726/3 |
| 2015/0215762 A1* | 7/2015 | Edge | H04W 8/005 370/338 |
| 2015/0247916 A1 | 9/2015 | Bartov et al. | |
| 2015/0334676 A1* | 11/2015 | Hart | H04W 64/003 455/456.1 |
| 2015/0351017 A1 | 12/2015 | Wirola et al. | |
| 2016/0054427 A1 | 2/2016 | Wirola et al. | |
| 2016/0066154 A1 | 3/2016 | Shin | |
| 2016/0094947 A1* | 3/2016 | Shen | H04W 8/26 455/456.1 |
| 2016/0192136 A1 | 6/2016 | Pan et al. | |
| 2016/0260059 A1 | 9/2016 | Benjamin et al. | |
| 2016/0374046 A1* | 12/2016 | Wirola | H04W 64/00 |
| 2017/0026806 A1 | 1/2017 | Jampani et al. | |
| 2017/0068902 A1 | 3/2017 | Kirshner | |
| 2017/0078851 A1 | 3/2017 | Agrawal et al. | |
| 2017/0142684 A1 | 5/2017 | Bhatt et al. | |
| 2017/0160375 A1 | 6/2017 | Syrjarinne et al. | |
| 2017/0311165 A1 | 10/2017 | Kang et al. | |
| 2017/0325070 A1 | 11/2017 | Wirola et al. | |
| 2017/0343639 A1 | 11/2017 | Ivanov et al. | |
| 2017/0343640 A1 | 11/2017 | Khan et al. | |
| 2018/0007067 A1 | 1/2018 | Kaushik | |
| 2018/0067187 A1 | 3/2018 | Oh et al. | |
| 2018/0070239 A1 | 3/2018 | Norrman et al. | |
| 2018/0113189 A1 | 4/2018 | Khan et al. | |
| 2018/0123708 A1 | 5/2018 | Khalajmehrabadi et al. | |
| 2018/0188348 A1 | 7/2018 | Wirola et al. | |
| 2018/0219869 A1 | 8/2018 | Kumar et al. | |
| 2018/0255430 A1 | 9/2018 | Ivanov et al. | |
| 2018/0279067 A1 | 9/2018 | Ivanov et al. | |
| 2018/0332558 A1 | 11/2018 | Chan et al. | |
| 2018/0352585 A1 | 12/2018 | Yang et al. | |
| 2019/0036951 A1* | 1/2019 | Kim | H04W 12/122 |
| 2019/0150001 A1 | 5/2019 | Jen et al. | |
| 2019/0174452 A1 | 6/2019 | Lev et al. | |
| 2019/0340363 A1 | 11/2019 | Walrant | |
| 2020/0015096 A1 | 1/2020 | Wirola et al. | |
| 2020/0036590 A1 | 1/2020 | Camarillo Gonzalez et al. | |
| 2020/0112570 A1* | 4/2020 | Yang | H04L 63/1408 |
| 2020/0200856 A1 | 6/2020 | Wirola et al. | |
| 2020/0200858 A1 | 6/2020 | Wirola et al. | |
| 2020/0200859 A1 | 6/2020 | Wirola et al. | |
| 2020/0200864 A1 | 6/2020 | Wirola et al. | |
| 2020/0200865 A1 | 6/2020 | Wirola et al. | |
| 2020/0204988 A1 | 6/2020 | Wirola et al. | |
| 2020/0205004 A1 | 6/2020 | Wirola et al. | |
| 2020/0205005 A1 | 6/2020 | Wirola et al. | |

FOREIGN PATENT DOCUMENTS

| | | |
|---|---|---|
| EP | 3 076 582 A1 | 10/2016 |
| EP | 3 410 156 A1 | 12/2018 |
| WO | WO 2015/189161 A1 | 12/2015 |
| WO | WO 2017/100686 A1 | 6/2017 |

OTHER PUBLICATIONS

Extended European Search Report for Application No. EP 18 21 4716 dated Jul. 5, 2019, 6 pages.
Extended European Search Report for Application No. EP 18 21 4721 dated Jul. 22, 2019, 7 pages.
Extended European Search Report for Application No. EP 18 21 4705 dated Jul. 5, 2019, 8 pages.
Extended European Search Report for Application No. EP 18 21 4688 dated Jul. 9, 2019, 6 pages.
Extended European Search Report for Application No. EP 18 21 4718 dated Jun. 17, 2019, 9 pages.
Extended European Search Report for Application No. EP 18 21 4720 dated Jul. 15, 2019, 8 pages.
Extended European Search Report for Application No. EP 18 21 4694 dated Jul. 5, 2019, 6 pages.
Extended European Search Report for Application No. EP 18 21 4724 dated Jul. 12, 2019, 9 pages.
U.S. Appl. No. 16/721,311, filed Dec. 19, 2019; In re: Wirola et al. entitled *Enabling Flexible Provision of Signature Data of Position Data Representing an Estimated Position*.
U.S. Appl. No. 16/723,451, filed Dec. 20, 2019; In re: Wirola et al. entitled *Service for Real-Time Spoofing/Jamming/Meaconing Warning*.
U.S. Appl. No. 16/723,620, filed Dec. 20, 2019; In re: Wirola et al. entitled *Crowd-Sourcing of Potentially Manipulated Radio Signals and/or Radio Signal Parameters*.
U.S. Appl. No. 16/723,662, filed Dec. 20, 2019; In re: Wirola et al. entitled *Device-Centric Learning of Manipulated Positioning*.
U.S. Appl. No. 16/723,721, filed Dec. 20, 2019; In re: Wirola et al. entitled *Identifying Potentially Manipulated Radio signals and/or Radio Signal Parameters Based on a First Radio Map Information and a Second Radio Map Information*.
U.S. Appl. No. 16/723,768, filed Dec. 20, 2019; In re: Wirola et al. entitled *Identifying Potentially Manipulated Radio Signals and/or Radio Signal Parameters Based on Radio Map Information*.
U.S. Appl. No. 16/723,802, filed Dec. 20, 2019; In re: Wirola et al. entitled *Identifying Potentially Manipulated Radio Signals and/or Radio Signal Parameters*.

(56) References Cited

OTHER PUBLICATIONS

GPS Spoofing A Growing Problem for Uber [online] [retrieved Feb. 17, 2020]. Retrieved via the Internet: https:/soliddriver.com/GPS-Spoofing-A-Growing-Problem-for-Uber (dated Nov. 10, 2019) 4 pages.
Galileo Commercial Service Implementing Decision enters into force Uber [online] [retrieved Feb. 17, 2020]. Retrieved via the Internet: https:/www.gsa.europa.eu/newsroom/news/galileo-commercial-service-implementing-decision-enters-force (dated Feb. 10, 2017) 6 pages.
Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.
Android keystore system | Android Developers [online] [retrieved Feb. 17, 2020]. Retrieved via the Internet: https://web.archive.org/web/20181212204557/https://developer.android.com/training/articles/keystore (dated Dec. 12, 2018) 17 pages.
Subscriber Identity Module—Wikipedia [online] [retrieved Feb. 17, 2020]. Retrieved via the Internet: https://web.archive.org/web/2017092316223/https://fi.wikipedia.org/wiki/Subscriber_Identity_Module (dated Sep. 23, 2017) 2 pages.
Extensible Authentication Protocol—Wikipedia [online] [retrieved Feb. 17, 2020], Retrieved via the Internet: https://web.archive.org/web/20171209152957/https://en.wikipedia.org/wiki/Extensible_Authentication_Protocol (dated Dec. 9, 2017) 10 pages.
Arkko, J. et al., *Extensible Authentication Protocol Method for 3rd Generation Authentication and Key Agreement (EAP-AKA)*, RFC4187 (Jan. 2006) 80 pages.
Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.
Enterprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco.com/c/en/us/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.
Final Office Action for U.S. Appl. No. 16/723,802 dated Sep. 2, 2020, 18 pages.
Office Action for U.S. Appl. No. 16/723,662 dated Jul. 9, 2020.
Office Action for U.S. Appl. No. 16/723,721 dated Jul. 1, 2020.
Extended European Search Report for Application No. EP 18214714.0 dated Jul. 5, 2019, 6 pages.
Final Office Action for U.S. Appl. No. 16/723,662 dated Dec. 18, 2020.
Notice of Allowance for U.S. Appl. No. 16/723,721 dated Nov. 16, 2020.
Notice of Allowance for U.S. Appl. No. 16/723,802 dated Nov. 6, 2020.
Non-Final Office Action for U.S. Appl. No. 16/723,451 dated Nov. 23, 2020.
Office Action for European Application No. 18214716.5 dated Feb. 5, 2021, 5 pages.
Non-Final Office Action for U.S. Appl. No. 16/723,662 dated May 7, 2021.
Final Office Action for U.S. Appl. No. 16/723,451 dated May 3, 2021.
Advisory Action for U.S. Appl. No. 16/723,662 dated Mar. 22, 2021.
Non-Final Office Action for U.S. Appl. No. 16/723,620 dated Mar. 25, 2021.
Non-Final Office Action for U.S. Appl. No. 16/723,768 dated Jun. 9, 2021.
Wirola et al., "Bandwidth and Storage Reduction of Radio Maps for Offline WLAN Positioning", 2013 International Conference on Indoor Positioning and Indoor Navigation, (Oct. 28-31, 2013), 9 pages.
Advisory Action for U.S. Appl. No. 16/723,451 dated Jul. 15, 2021.
Office Action for European Application No. 18214718.1 dated Jul. 14, 2021, 9 pages.
Office Action for European Application No. 18214724.9 dated Jun. 30, 2021, 8 pages.
Non-Final Office Action for U.S. Appl. No. 16/723,451 dated Sep. 7, 2021.
Office Action for European Application No. 18214688.6 dated Aug. 25, 2021, 4 pages.
Office Action for European Application No. 18214694.4 dated Aug. 27, 2021, 4 pages.
Final Office Action for U.S. Appl. No. 16/723,620 dated Sep. 29, 2021.
Final Office Action for U.S. Appl. No. 16/723,662 dated Oct. 15, 2021.
Final Office Action for U.S. Appl. No. 16/723,768 dated Nov. 1, 2021.
Notice of Allowance for U.S. Appl. No. 16/723,768 dated Nov. 22, 2021.

\* cited by examiner

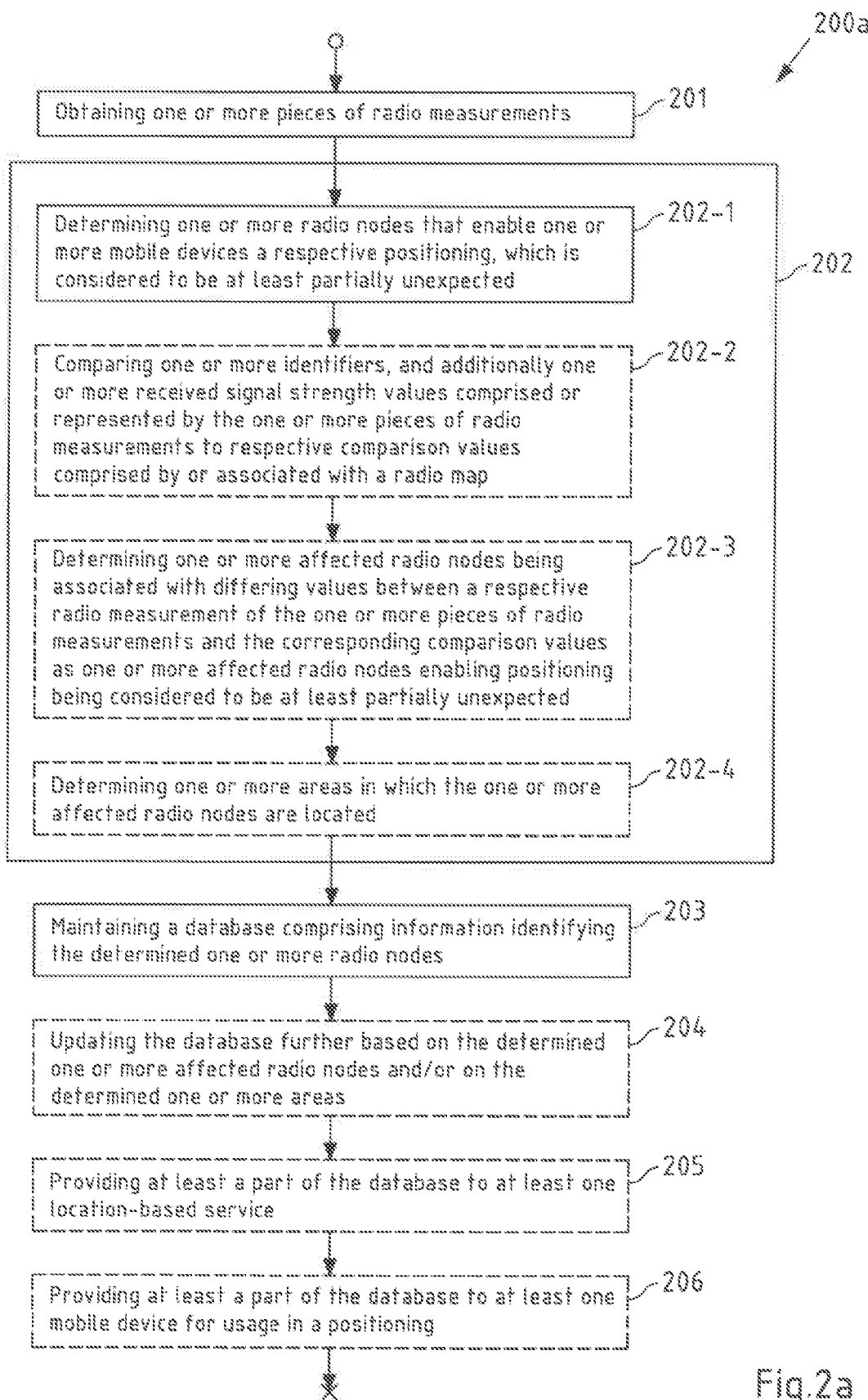

STATISTICAL ANALYSIS OF MISMATCHES FOR SPOOFING DETECTION

CROSS-REFERENCE TO RELATED APPLICATIONS

This application claims priority to European Application No. 18214720.7, filed Dec. 20, 2018, the entire contents of which are incorporated herein by reference.

FIELD

The invention relates to the field of non-GNSS based radio positioning and more specifically to identifying potentially manipulated radio signals and/or radio signal parameters.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, BLUETOOTH Low Energy (BLE) or other ultrahigh frequency (UHF) radio wave based positioning systems, cellular network based positioning systems and wireless local area network (WLAN) based positioning systems.

Such a non-GNSS based radio positioning system (e.g. a self-contained positioning system) may be divided in at least three stages: an installation stage, a training stage and a positioning stage.

In the installation stage, dedicated positioning support radio nodes (e.g. BLUETOOTH or other radio wave beacons) may be installed in the environment for which a positioning system is to be provided. Alternatively or additionally, a non-GNSS based radio positioning system may make use of existing radio nodes like WLAN access points or cellular network nodes as positioning support radio nodes.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio nodes (e.g. BLUETOOTH beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. BLUETOOTH beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EXEMPLARY EMBODIMENTS

Non GNSS-based radio positioning systems (e.g. BLUETOOTH, WLAN and cellular based radio positioning systems) as disclosed above may be affected by manipulating radio signals that are used for positioning purposes during the positioning stage.

Manipulation techniques may for example be spoofing or jamming of such radio signals:
Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic signals captured at a different position and/or time. Alternatively, a spoofing malware running on the mobile device may falsify scanning results (e.g. detected radio signal parameters) when the mobile device scans for observable radio signals for estimating its position. Such falsified (i.e. "spoofed") radio signals or scanning results may be used to cause the mobile device to determine its position to be somewhere other than where it actually is.
Jamming of radio signals may be considered to relate a deliberate attempt to disrupt detecting one or more radio signals by a mobile device, for example by transmitting radio signals and/or radio noise interfering the one or more radio signals.

Such manipulation techniques are a threat to business models which rely on trustworthy positioning like car sharing services.

It is inter-alia an object of the present invention to improve the above disclosed non-GNSS based radio positioning systems to enable mitigating the threat associated with such manipulation techniques.

While devices can provide excellent information, in fact the largest device base uses e.g. cloud-based APIs (Application Programming Interface(s)) for positioning, e.g. since the devices have cheap power, low CPU capabilities, low battery power, and/or limited connectivity, such as found in IoT (Internet-of-Things devices). This device base may in fact provide the largest data flow for spoofing, jamming, and/or meaconing database.

According to a first exemplary aspect of the present invention, a method is disclosed, the method comprising:
  obtaining one or more pieces of radio measurements, wherein a respective radio measurement of the one or more pieces of radio measurements is indicative of one or more identifiers of one or more radio nodes that are observable at a certain position;
  determining one or more radio nodes that enable one or more mobile devices a respective positioning, wherein the positioning that is enabled by radio signals sent by each radio node of the one or more radio nodes is considered to be at least partially unexpected, wherein said one or more radio nodes are determined at least partially based on the one or more pieces of radio measurements; and
  maintaining a database comprising information identifying the determined one or more radio nodes.

This method may for instance be performed and/or controlled by an apparatus, for instance a server. Alternatively, this method may be performed and/or controlled by more than one apparatus, for instance a server cloud comprising at least two servers. For instance, the method may be performed and/or controlled by using at least one processor of the server or the server cloud. The method may be performed and/or controlled by a module or component executed by such as server or server cloud.

According to a further exemplary aspect of the invention, a computer program is disclosed, the computer program when executed by a processor causing an apparatus, for instance a server or a server cloud, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect (e.g. the first exemplary aspect) of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:
  obtaining at least a part of a database comprising information identifying one or more radio nodes that enable one or more mobile devices a positioning, wherein the one or more radio nodes enable the at least one mobile device a respective positioning, wherein the positioning that is enabled by radio signals sent by each radio node of the one or more radio nodes is considered to be at least partially unexpected; and
  storing at least the part of the database.

This method may for instance be performed and/or controlled by a mobile device, e.g. a mobile terminal, a smartphone, a tablet, a wearable, an IoT device. For instance, the method may be performed and/or controlled by using at least one processor of the mobile device. The method may be performed and/or controlled by a module or component executed by such a mobile device.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect (e.g. the second exemplary aspect) of the invention may be a module or a component for a device, for example a chip. Alternatively, the disclosed apparatus according to any aspect of the invention may be a device, for instance a mobile device. The disclosed apparatus according to any aspect of the invention may comprise only the disclosed components, for instance means, processor, memory, or may further comprise one or more additional components.

According to a third exemplary aspect of the invention, a system is disclosed, comprising:

a first apparatus according to the first exemplary aspect of the present invention as disclosed above, configured to perform and/or control the method of the first exemplary aspect of the present invention, and a second apparatus according to the second exemplary aspect of the present invention as disclosed above, configured to perform and/or control the method of the second exemplary aspect of the present invention.

The first apparatus and the second apparatus may in particular be configured to perform the respective methods according to the first and the second exemplary aspect of the present invention together.

In the following, exemplary features and exemplary embodiments of all aspects of the present invention will be described in further detail.

One or more pieces of radio measurements are obtained, wherein a respective radio measurement of the one or more pieces of radio measurements is indicative of one or more identifiers of one or more radio nodes that are observable at a certain position.

A respective radio measurement of the one or more pieces of radio measurements may for instance be gathered by measuring one or more radio signals of one or more radio nodes that are observable at the position at which the measurement is performed and/or controlled. Such a measurement may for instance be based, at least partially, on one or more radio signals of the one or more radio nodes. Additionally or alternatively, such a measurement may for instance be based on one or more signals of a cell, e.g. a base station of a cellular communication network currently providing cellular communication service(s) to the respective mobile device.

After such one or more pieces of radio measurements are gathered, the one or more pieces of radio measurements may for instance be output, by sending the one or more pieces of radio measurements e.g. to the apparatus performing and/or controlling the method according to the first exemplary aspect of the present invention which obtains them. The one or more pieces of radio measurements may for instance be obtained by receiving the one or more pieces of radio measurements. The one or more pieces of radio measurements may for instance be obtained (e.g. received) from one or more mobile devices (e.g. an IoT device, a smart home device, a smartphone, a tablet computer, a notebook computer, a smart watch, a smart band, to name but a few non-limiting examples), in particular one or more mobile devices performing and/or controlling the method according to the second exemplary aspect of the present invention, or from a server or a server cloud that is different from the apparatus performing and/or controlling the method according to the first exemplary aspect of the present invention, which relays the one or more pieces of radio measurements to the apparatus configured to perform and/or control the method according to the first exemplary aspect of the present invention.

For example, the disclosed methods according to the first and/or second exemplary aspect of the present invention may be part of a non-GNSS based radio positioning system as disclosed above. The respective mobile device may be enabled for or support such a non-GNSS based radio positioning system. This may be understood to mean that a respective mobile device is configured to estimate (e.g. determine) or to cause estimating (e.g. determining) its position at least partially based on a (e.g. gathered) radio measurement comprising or representing radio signal parameters of one or more radio signals (e.g. one or more terrestrial radio signals) obtained at this position (e.g. obtained as a scanning result of scanning for observable radio signals at this position). Estimating (e.g. determining) of a position of the mobile device at least partially based on (a) radio signal parameter(s) may be understood to mean that the estimating is performed as a function of the radio signal parameter(s). It is however to be understood that the estimating may optionally depend on further information like a radio map. For example, such a radio map may be configured to enable mobile devices to estimate their position at least partially based on this radio map when the mobile devices are located in the area covered by the radio map. For example, the radio map is represented by radio map information which may be provided (e.g. transmitted) by a positioning server to the respective mobile device and/or which may be hold available by the respective mobile device (e.g. stored in memory means of the mobile device(s)). For example, the radio map contains or represents a respective radio model for a plurality of radio nodes transmitting (e.g. broadcasting) radio signals that are observable within the area covered by the radio map. If the radio map covers a venue (e.g. building), the radio map may contain or represent, e.g. for each floor of the venue, a respective radio model for a plurality of radio nodes transmitting (e.g. broadcasting) radio signals that are observable on the respective floor of the venue.

Such a radio node may be a specific WI-FI, BLUETOOTH, cellular, other radio wavelength communication standard, or a combination thereof enabled radio node. For instance, a specific radio node of one or more radio nodes may for instance be identified by its identifier (ID). Thus, the identifier of at least one radio node of the one or more radio nodes may for instance be stored in the database to identify the respective radio node. Further, based on a respective identifier, for instance, the position of the respective radio node may for instance be determined. To name but one non-limiting example, the respective identifier may be associated with its current position (e.g. in the form of coordinates; x- and y-coordinates or latitude- and longitude-coordinates) so that the position of the respective radio node is at least determinable at least partially based on its identifier.

Such (a) radio node(s) of one or more radio nodes may for instance be used for indoor positioning and/or floor detection, e.g. according to BT- (BLUETOOTH) and/or BLE-specification, or may for instance be a WI-FI access point for indoor positioning and/or floor detection, e.g. according to the WLAN- (Wireless Local Area Network) specification.

Such (a) radio node(s) of one or more radio devices, e.g. of a certain venue or its section, and/or of a certain floor or its section, may for instance comprise or be connectable to a transceiver, e.g. according to the BT-, BLE, and/or WLAN-specification to provide wireless-based communication. Each radio node of the one or more radio nodes may for instance use such a transceiver for transmitting and/or broadcasting one or more radio signals, e.g. comprising or containing one or more information and/or potentially manipulated radio signals and/or radio signal parameters.

In case such (a) radio node(s) transmits potentially manipulated radio signals and/or radio signal parameters, it is referred to such (a) radio node(s) herein as affected radio node(s).

In case the potentially affected radio node(s) are identified (e.g. based on its respective identifier as comprised by the maintained database), an action may be taken when e.g. a respective mobile device performing and/or controlling the method according to the second exemplary aspect of the present invention is located (or e.g. arriving) again in the affected area within which the affected radio node is located, or when detecting a radio node, which has previously been detected to be spoofed. The action may enable the prevention of a position to be determined (e.g. estimated) which is at least partially based on the radio signal(s) or radio signal parameter(s) of the affected radio node.

As disclosed above, potentially manipulated radio signals and/or radio signal parameters may be used for spoofing, jamming, meaconing, or a combination thereof. Thus, once spoofing, jamming, meaconing, or a combination has been detected, maintaining a database of those attempts may be achieved. Such a database may for instance be stored in a memory of the respective apparatus (e.g. a server (first exemplary aspect); a mobile device (second exemplary aspect)), e.g. in the respective apparatus' non-volatile memory.

The database may for instance be maintained in such a memory. Such a memory may for instance be comprised by or be connectable to the apparatus performing and/or controlling the method according to the first exemplary aspect of the present invention. The maintaining of the database may for instance be referred to as keeping the database. The database may for instance be available upon a certain request so that e.g. independent upon a communication connection information of the database can be retrieved to be further utilized, e.g. for determining a position of the apparatus performing and/or controlling the method according to the first exemplary aspect of the present invention.

A respective radio model for a respective radio node of the plurality of radio nodes, as disclosed above, may be understood to represent at least the expected radio coverage of the respective radio node (e.g. on a certain floor of a building). For example, the radio model of such a radio node may describe the coverage area (e.g. on a certain floor of a venue) within which radio signals transmitted or triggered to be transmitted by this radio node are expected to be observable. An example for such a radio model is a radio image representing an expected radio signal strength field of the radio signals transmitted or triggered to be transmitted by this radio node. The real radio coverage of such a radio positioning support device may however deviate from the expected radio coverage as described by such a radio model.

Such one or more radio signals may be terrestrial radio signals. Examples of such a terrestrial radio signal are a BLUETOOTH signal, a BLE signal, a cellular network signal or a WLAN signal. The BLUETOOTH standards are specified by the BLUETOOTH Special Interest Group and are presently available under www.bluetooth.com. A cellular network may for example be a mobile phone network like a 2G/3G/4G/5G cellular communication network. The 2G/3G/4G/5G cellular radio communication standards are developed by the 3GPP and presently available under www.3gpp.org. WLAN is for example specified by the standards of the IEEE 802.11 family (www.ieee.org).

A radio signal parameter of a certain radio signal may for example be obtained by the mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, a respective mobile device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information contained in the radio signal and (2) a representation (e.g. an indicator or a value) of a physical quantity (e.g. a received signal strength) of the radio signal. Accordingly, a radio signal parameter may be determined by at least one of (1) extracting information contained in the radio signal and (2) measuring a physical quantity (e.g. a received signal strength) of the radio signal.

According to an exemplary embodiment of all aspects of the present invention, the one or more radio nodes that enable one or more mobile devices a positioning are determined further based on a radio map.

For example, the mobile device may scan for observable radio signals at a first position and a second position for estimating its position (e.g. based on a non-GNSS based radio positioning system as disclosed above). One or more first radio signal parameters and one or more second radio signal parameters may then be obtained as scanning results. As discussed above, a spoofing malware running on the mobile device may falsify such scanning results.

If spoofing occurs, the one or more radio signals and/or the first radio signal parameters and second radio signal parameters may behave in an unexpected way and, thus, the second radio signal parameters may be determined to be unexpected for the second position of the mobile device. For example, if a malware running on the mobile device falsifies the scanning results, a representation of a certain physical quantity of the one or more radio signals may not change when the mobile device moves from the first position to the second position. Accordingly, if it is determined that the second radio signal parameters are unexpected for the second position of the mobile device, the one or more radio signals and/or the first radio signal parameters and the second radio signal parameters may be considered to be potentially manipulated. The disclosed method allows maintaining a database comprising such identified potentially manipulated radio signals and/or radio signal parameters and/or radio nodes and/or areas within which such potentially manipulated radio signals and/or radio signal parameter are propagated and/or such (a) radio(s) are located and, thus, to mitigate threats associated with manipulation techniques like spoofing, meaconing and jamming.

Information identifying such a radio node(s) may for instance be stored in the database. The database may for instance be a (e.g. simple) geospatial database. When maintaining (e.g. comprising a storing or an updating of an existing database) with data for one or more radio nodes and/or one or more (e.g. geographical) areas within which such (a) radio node(s) as comprised or represented by the information identifying such (a) radio node(s) are located, for instance, the Earth surface may for instance be divided into a multi-scale grid (geospatial index) that allows associating data structures with each of the respective geographical areas. Further, such data may be associated with each of the respective geographical areas and/or with at least one of the one or more radio nodes stored in the database at varying spatial resolution. In this way, the storage needed by the database and the speed at which data in the database can be accessed may for instance be optimized.

According to an exemplary embodiment of all aspects of the present invention, a respective radio measurement of the one or more pieces of radio measurements comprises one or more identifiers indicative of one or more radio nodes that are observable at the certain position, and optionally one or more received signal strength values determined based on radio signals sent by the one or more radio nodes.

In the maintained a database, information identifying one or more potentially affected radio nodes are comprised or represented. To determine such (an) affected radio node(s), e.g. the one or more pieces of radio measurements are analyzed, e.g. whether or not positioning enabled by one or more radio nodes, e.g. represented by its identifiers in the respective radio measurement(s) is considered to be at least partially unexpected.

According to an exemplary embodiment of the first exemplary aspect of the present invention, the determining of the one or more radio nodes that enable one or more mobile devices a positioning further comprises:

comparing the one or more identifiers, and additionally the one or more received signal strength values to respective comparison values comprised by or associated with the radio map;

determining one or more affected radio nodes being associated with differing values between a respective radio measurement of the one or more pieces of radio measurements and the corresponding comparison values as one or more radio nodes enabling positioning, wherein said positioning enabled by these one or more radio nodes is considered to be at least partially unexpected; and updating the database based on the determined one or more affected radio nodes.

Such comparison values may for instance be comprised or represented by a radio map, e.g. a radio map as disclosed above.

Manipulation techniques may for example be spoofing, jamming, and/or meaconing of such radio signals. Then, positioning that is performed and/or controlled at least partially based on such radio signals may for instance be at least partially unexpected. Such a manipulation may for instance be avoidable in case a respective radio node that may be subject to spoofing, jamming, and/or meaconing of such radio signals is identified, e.g. by determining them as one or more affected radio nodes. Then, e.g. mobile devices performing and/or controlling positioning may for instance take at least one of several actions to avoid the manipulation techniques to be successful. For example, an attacker may install a spoofing radio node in a certain area to deceive one or more mobile devices to cause them to determine to be located within the overlapping region of the coverage areas described by the radio models of one or more radio nodes (e.g. BLE beacons, and/or WiFi access points). Such a spoofing radio node may be configured to (e.g. automatically and/or repeatedly) transmit spoofed e.g. BLE and/or WiFi radio signals containing or representing the respective identifier (e.g. UUIDs of BLE beacons, and/or SSIDs of WiFi access points). If the at least one mobile device determines their position at least partially based on radio signal parameters of these spoofed radio signals, they may determine (e.g. estimate) their position to be within the overlapping region of the (e.g. coverage) areas described by the radio models of the respective radio node(s).

In case such an unexpected position is determined (e.g. identified), the one or more radio nodes that were used for determining the position estimate may for instance be considered to be under influence. In order to identify the specific affected radio node, for instance one or more comparisons between several determinations of position estimates and the respectively involved radio nodes may for instance be performed so that the affected radio node can be identified. Then, e.g. the respective identifier of the affected radio node may for instance be maintained in the database. Such a respective identifier may for instance be comprised or represented by information identifying the respective affected radio node.

According to an exemplary embodiment of all aspects of the present invention, the method further comprises:

determining one or more areas in which the one or more affected radio nodes are located, wherein the one or more areas are determined at least partially based on the one or more affected radio nodes; and updating the database based on the determined one or more areas.

A respective area of the one or more areas may for instance be identifiable by a respective area identifier, in the same way as disclosed above with respect to the respective identifier of a respective (e.g. affected) radio node. Further, such an area identifier may for instance enable to determine e.g. the size and the form (e.g. geographical area) of the respective area. Within such a respective area, e.g. at least one affected radio node may for instance be located. Such an area may for instance be represented by a multi-scale grid (geospatial index) as a part of a respective spatial database.

Such an area of the one or more areas may for instance be a geographical area (e.g. a two dimensional polygon), a venue or its section, a floor or its section, or a combination thereof. In case the area represents a venue or its section, and/or a floor or its section, one or more radio nodes may for instance be installed in the venue or its section, and/or in the floor or its section.

The disclosed method according to the first exemplary aspect of the present invention further allows to keep track of one or more radio nodes and/or one or more areas within which the one or more radio nodes are located, wherein those one or more radio nodes are considered to be under at least one of spoofing, jamming and meaconing influence. Those one or more radio nodes are considered to propagate potentially manipulated radio signals and/or radio signal parameters which influence the result of a position. In order to avoid such potentially manipulated positions to be determined based on the radio signals of the one or more radio nodes, one or more further actions may be performed to counter them.

According to an exemplary embodiment of all aspects of the present invention, a respective area of the one or more areas is one of the following:

i) a geographical area (e.g. 2D polygon);

ii) a venue or a section of the venue; or iii) a floor or a section of the floor.

A geographical area may for instance be represented by a map or a section of a respective map. Such a geographical area may for instance be represented by a two-dimensional (2D) polygon. Such a 2D-polygon, as used herein, may be understood as a closed form of multiple edges being connected to each other with boundaries in straight lines. The venue may for instance be a building, shopping mall, office complex, public accessible position (e.g. station, airport, university or the like), to name but a few non-limiting examples. Thus, a section of a respective venue is at least one part that is comprised by the entire venue. Further, a floor may for instance be such a part of the venue. Correspondingly, a part of a floor is at least a part that is comprised by the entire floor.

According to an exemplary embodiment of all aspects of the present invention, the method further comprises:

determining a position estimate at least partially based on the database; and outputting the determined position estimate.

As disclosed above, the radio map may be determined by a respective positioning server during a training stage of the non-GNSS based radio positioning system. Causing of determining (e.g. estimating) of a position of a mobile device at least partially based on the radio signal parameter(s) may be understood to mean that the radio signal parameter(s) are provided (e.g. transmitted) by a respective mobile device to a server (e.g. a positioning server performing and/or controlling the method according to the first exemplary aspect of the present invention) to cause the server to determine a position of the mobile device at least partially based e.g. on the radio signal parameter(s).

The determining of one or more affected radio nodes, of one or more areas within which e.g. one or more affected radio nodes are located, or alternatively, within which none affected radio node is located, and/or of a respective position estimate may for instance be determined by a processor of the apparatus performing and/or controlling the method according to the first exemplary aspect of the present invention.

Optionally, the determined position estimate is output, e.g. to the entity from which e.g. an obtained request for determining the position estimate stems, or to another entity that is different from the entity from which the obtained request stems, and which transmits (e.g. relays) the output position estimate to the entity from which the obtained request stems. The position estimate may for instance be output via the communication interface of the apparatus performing and/or controlling the method according to the first exemplary aspect of the present invention. Such a communication interface may for instance comprise one or more radio transceivers (e.g. transmitter and receiver), e.g. according to WLAN-, BT-, BLE-, cellular-communication standard, or a combination thereof, to name but a few non-limiting examples.

According to an exemplary embodiment of the first exemplary aspect of the present invention, the method further comprises:

providing at least a part of the database to at least one position-based service.

According to an exemplary embodiment of the first exemplary aspect of the present invention, the method further comprises:

providing at least a part of the database to at least one mobile device for usage in a positioning, in particular an offline positioning performed and/or controlled by the at least one mobile device.

At least a part of the database comprising information identifying one or more radio nodes that enable a positioning that is considered to be at least partially unexpected may for instance be provided (e.g. distributing) for usage in a positioning. Such a part of the database may for instance be a subset of the information identifying one or more radio nodes that enable a positioning that is considered to be at least partially unexpected, e.g. stored in the database. For instance, in case the database comprises a plurality (e.g. at least two) of areas, wherein in each of the plurality of areas at least one affected radio node is located, a respective subset may for instance be one of those plurality of areas. Then, by providing a part—the subset—of the database, e.g. information identifying the at least one affected radio node of this area of the plurality of areas may for instance be provided.

Such one or more subsets of the database may for instance be provided (e.g. transferred) to one or more mobile device(s), e.g. mobile devices performing and/or controlling the method according to the second exemplary aspect of the present invention. Obviously, a single mobile device may for instance not require a full (e.g. global) database, as used within the meaning of the present invention. Thus, when a respective mobile device may for instance retrieve (e.g. request) the respective database, e.g. from the server or a server cloud performing and/or controlling the method according to the first exemplary aspect of the present invention, the respective mobile device may for instance provide e.g. an indication of its position (e.g. a position estimate) prior to the retrieving. In this way, e.g. the server or server cloud performing and/or controlling the method according to the first exemplary aspect of the present invention may for instance return relevant data for the surroundings of the respective mobile device (e.g. an area—e.g. a subset of the database—in which the respective mobile device is located, only). Further, this enables to keep the size of the data to be transferred, e.g. from the server or the server cloud to the respective mobile device low. Moreover, in such a request, the respective mobile device(s) may for instance also state information comprising or representing one or more radio capabilities of the respective mobile device, so that e.g. subsets of the database may for instance only be provided to the respective mobile device(s) for the relevant radios.

At least a part of the database (e.g. a subset, as disclosed above) may for instance be provided by outputting the part of the database, e.g. to another entity that is different from the entity that is different from the respective mobile device, and which transmits (e.g. relays) the output part of the database to the mobile device. At least the part of the database may for instance be output via a communication interface of the apparatus performing and/or controlling the method according to the first exemplary aspect of the present invention. Such a communication interface may for instance comprise one or more radio transceivers (e.g. transmitter and receiver), e.g. according to WLAN-, BT-, BLE-, cellular-communication standard, or a combination thereof, to name but a few non-limiting examples.

Further, in case at least the part of the database may for instance be provided to be utilized in offline positioning, at least a part of the information in the database is output to one or more mobile device that perform and/or control positioning at least partially based on the output information of the database.

Additionally or alternatively, in case at least the part of the database may for instance be provided to be utilized in online positioning, e.g. a request comprising one or more pieces of radio measurements and requesting that a position estimate is determined at least partially on the one or more pieces of radio measurements may for instance be received. Then, a position estimate is determined at least partially based on the database and on the one or more pieces of radio measurements. After the position estimate is determined, the position estimate is output, e.g. to the respective mobile device from which the request stems.

At least a part of a database comprising information identifying one or more radio nodes that enable one or more mobile devices a positioning, wherein the positioning that is enabled by each radio node of the one or more radio nodes is considered to be at least partially unexpected may for instance be obtained. At least a part of the database may for instance be obtained, e.g. by receiving at least the part of the database, e.g. from an apparatus performing and/or controlling the method according to the first exemplary aspect of the present invention. For instance, afterwards, the gathered radio measurement may be output. Then, e.g. the apparatus performing and/or controlling the method according to the first exemplary aspect of the present invention may for instance determine a position estimate indicative of the position at which the radio measurement was gathered by the mobile device performing and/or controlling the method according to the second exemplary aspect of the present invention. Then, e.g. a part of the database e.g. indicative of an area in which the mobile device is located, is output, so that it can be obtained by the mobile device.

The obtaining of at least a part of a database may for instance take place e.g. at the startup of some application or the like, wherein the application is executed by the at least one mobile device. The obtaining may for instance be performed and/or controlled for a pre-determined area, e.g. as pre-determined by such an application executed by the at least one mobile device.

Further, at least the part of the database that was obtained may for instance be stored locally at the mobile device.

At least the part of the database may for instance be stored e.g. for later use in a positioning. For instance, in case the mobile device enters again an area within which one or more affected radio nodes are located, the locally stored database may for instance be utilized to identify such one or more affected radio nodes. Then, e.g. one or more actions may for instance be performed by the mobile device, e.g. to avoid that manipulation attempts of spoofing, jamming, or meaconing could be performed by the affected radio node(s).

According to an exemplary embodiment of the second exemplary aspect of the present invention, the method further comprises:
  gathering at least one radio measurement indicative of one or more identifiers of one or more radio nodes that are observable at a certain position at which the at least one mobile device is located; and
  determining a position estimate indicative of a current position of the at least one mobile device at least partially based on the part of the database.

A respective radio measurement may for instance be gathered by measuring one or more radio signals of one or more radio nodes that are observable at the position at which the measurement is performed and/or controlled. A respective radio measurement may for instance be performed and/or controlled by a mobile device performing and/or controlling the method according to the second exemplary aspect of the present invention. Such a measurement may for instance be based, at least partially, on one or more radio signals of the one or more radio nodes. Additionally or alternatively, such a measurement may for instance be based on one or more signals of a cell, e.g. a base station of a cellular communication network currently providing cellular communication service(s) to the respective mobile device.

A respective identifier of the one or more identifier may for instance identify a radio node, e.g. a specific radio node like WI-FI, BLUETOOTH, cellular, other radio wavelength communication standard, or a combination thereof enabled radio node. For instance, a specific radio node may for instance be identified by its identifier (ID).

After the one or more radio measurements are gathered, at least a part of a database comprising information identifying one or more radio nodes that enable one or more mobile devices a positioning, wherein the positioning that is enabled by each radio node of the one or more radio nodes is considered to be at least partially unexpected may for instance be obtained.

For instance, the obtaining of at least a part of a database may for instance take place e.g. at the startup of some application or the like, e.g. for a pre-determined area, e.g. as pre-determined by such an application executed by the at least one mobile device. Then, e.g. the gathering of a respective radio measurement may for instance take place (e.g. at a later time), e.g. when positioning is needed.

As disclosed above, a radio map may be determined by a positioning server during a training stage of the non-GNSS based radio positioning system. Then, such a radio map, or a part of it, may for instance be provided to the mobile device. Causing of determining (e.g. estimating.) of a position of the mobile device may for instance be enabled at least partially based on a radio measurement, e.g. comprising radio signal parameter(s), and the obtained radio map. Alternatively, e.g. in case the mobile device may not have obtained such a radio map, or a part of it, causing of determining (e.g. estimating) of a position of the mobile device may be understood to mean that the radio signal parameter(s) (e.g. comprised or represented by a radio measurement) are provided (e.g. transmitted) by the mobile device are output to a positioning server (e.g. storing a respective radio map) to cause the positioning server to estimate (e.g. determine) a position of the mobile device at least partially based on the radio signal parameter(s). It will be understood that such a positioning server may for instance perform and/or control the method according to the first exemplary aspect of the present invention.

According to an exemplary embodiment of the second exemplary aspect of the present invention, the method further comprises:
  outputting a positioning request indicative of requesting a current position of the at least one mobile device to be determined; and
  obtaining a position estimate indicative of a current position of the at least one position device.

According to an exemplary embodiment of the second exemplary aspect of the present invention, the method further comprises:
  obtaining one or more areas in which the one or more radio nodes enabling position that is considered to be at least partially unexpected are located; and
  updating at least the part of the database based on the one or more areas.

In order to obtain the position estimate, e.g. a positioning request may for instance be output, e.g. to a positioning server. As a response, a determined position estimate may for instance be obtained, e.g. by receiving the position estimate from the positioning server.

Further, e.g. a positioning server may for instance be utilized as follows: Such a positioning server may for instance comprise or be connectable to a database storing a global radio map, and/or one or more partial radio maps. Such a radio map may for instance be generated based on one or more radio signal parameter(s), e.g. one or more pieces of fingerprint information (e.g. radio fingerprint observation report) so that such a radio map may for instance be utilized to determine a position estimate for the device that has gathered (e.g. measured) a respective radio measurement. Since e.g. the corresponding fingerprint indicative of the current position of the mobile device may for instance be comprised or represented by such a radio map, a determined position estimate may for instance be determined to represent this position.

Further, the positioning request may for instance comprise or represent an identifier of the mobile device whose position is requested to be determined. Thus, the request may for instance not be output by the mobile device performing and/or controlling the method according to the second exemplary aspect of the present invention, but by another entity, e.g. another mobile device, even by a third party.

The positioning request may for instance be output via a communication interface of the mobile device performing and/or controlling the method according to the second exemplary aspect of the present invention.

Such a position estimate may for instance be in the form of coordinates, e.g. x-, y-coordinates, and/or latitude-, longitude-coordinates. Optionally, such a position estimate may for instance comprise or represent a three-dimensional position, e.g. in the form of three-dimensional coordinates (e.g. x-, y-, z-coordinates, and/or latitude-, longitude-, altitude-coordinates).

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 2a is a flowchart illustrating an exemplary embodiment of a method according to the first exemplary aspect of the present invention;

FIG. 2b is a flowchart illustrating an exemplary embodiment of a method according to the first exemplary aspect of the present invention, which may for instance be performed and/or controlled in addition to the flowchart of FIG. 2a;

FIG. 3b-c are respective flowcharts illustrating exemplary embodiments of a method according to the second exemplary aspect of the present invention, which may for instance be performed and/or controlled in addition to the flowchart of FIG. 3a;

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
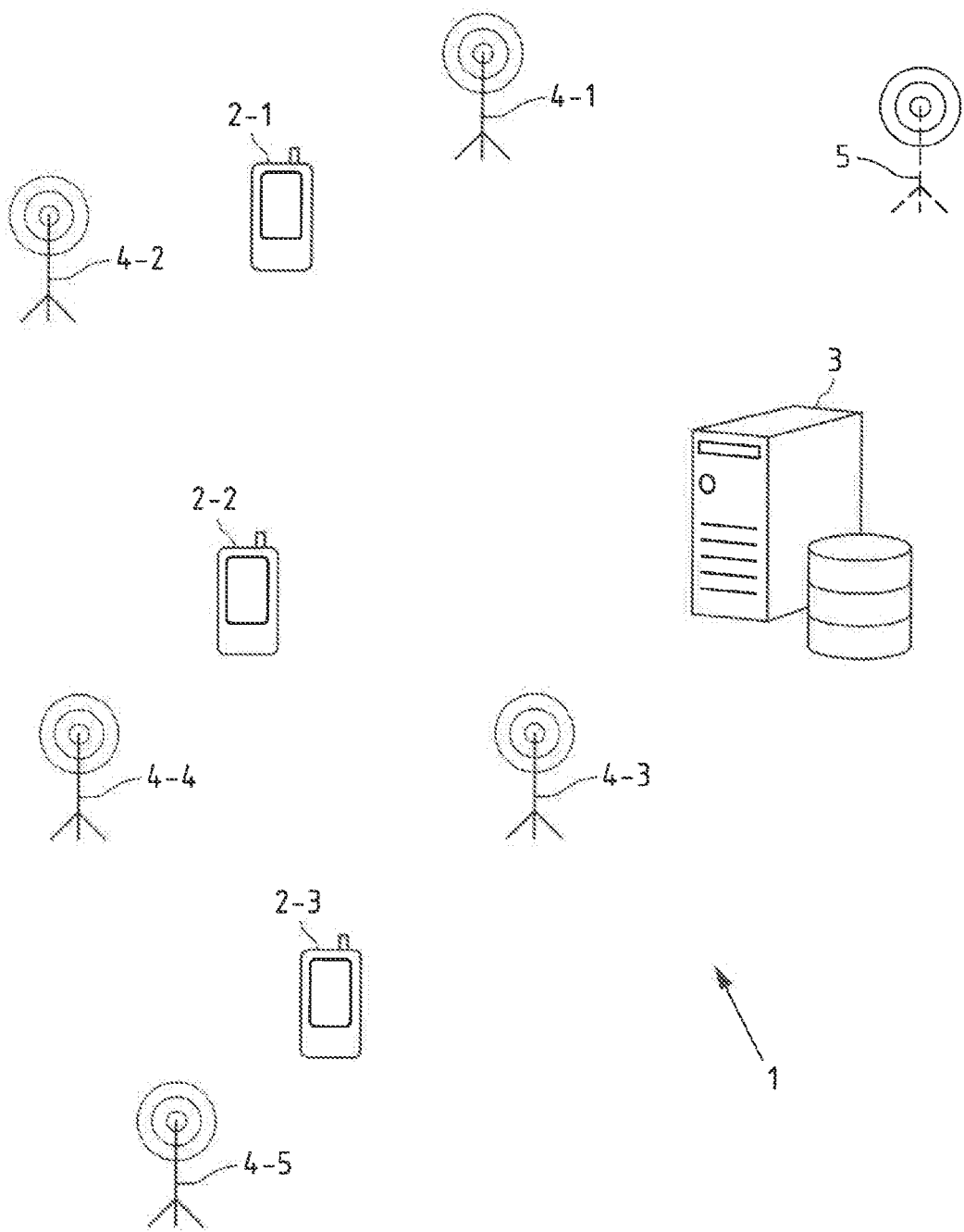
FIG. 1 is a block diagram of an exemplary embodiment of a system according to the third exemplary aspect of the present invention.

FIG. 1 is a schematic high-level block diagram of a system 1 according to an exemplary aspect of the present invention. In the following, it is assumed that system 1 is a non-GNSS based radio positioning system for a predetermined environment like a venue (e.g. building or a complex of buildings, such as a shopping center, a parking garage, an airport, a company site, etc.).

For example, each of mobile devices 2-1 to 2-3 may be one of a smartphone, a tablet computer, a notebook computer, a smart watch, a smart band, and an IoT device. Mobile devices 2-1 to 2-3 may be enabled for or support non-GNSS based radio positioning system 1.

System 1 comprises an affected (e.g. spoofed) radio node 5, which may for instance be installed by a fraudulent third party in the venue. Thus, this radio node 5 may for instance employ a manipulation technique like spoofing, jamming and/or meaconing in the venue so that position estimates determined in the venue under consideration of radio signals and/or radio signal parameters of this radio node 5 comprise or represent a false position.

System 1 comprises a positioning server 3 and a plurality of optional radio nodes 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio nodes 4-1 to 4-5 are dedicated position support radio nodes in the form of BLE beacons 4-1 to 4-5 fixedly installed in the predetermined environment of system 1. However, system 1 may comprise further radio nodes or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio nodes 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio nodes 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 3 for determining a radio map.

For example, the radio map may be configured to enable mobile devices 2-1 to 2-3 to determine (e.g. estimate) their position at least partially based on this radio map when the mobile devices are located within the predetermined environment of system 1 (i.e. the area covered by the radio map). For example, the radio map is represented by radio map information which may be provided (e.g. transmitted) by a positioning server 3 to mobile devices 2-1 to 2-3 and/or which may be hold available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio node. For example, the radio model of such a BLE beacon may at least describe the coverage area within which radio signals transmitted by this radio node are expected to be observable.

In the positioning stage, mobile devices 2-1 to 2-3 may use the radio map to determine (e.g. estimate) their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 an 4-3.

As discussed above, non GNSS-based radio positioning systems like system 1 may be affected by manipulating radio signals that are used for positioning purposes during the positioning stage. Manipulation techniques may for example be spoofing or jamming of such radio signals as described above in more detail. For example, an attacker may install the affected (e.g. spoofed) radio node 5 in a certain area to deceive mobile devices 2-1 to 2-3 to cause them to determine to be located within the overlapping region of the coverage areas described by the radio models of BLE beacons 4-1, 4-2 an 4-3. The spoofing radio node 5 may be configured to (e.g. automatically and/or repeatedly) transmit spoofed BLE radio signals containing or representing the UUIDs of BLE beacons 4-1, 4-2 and 4-3. If mobile devices 2-1 to 2-3 determine (e.g. estimate) their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area.

Example embodiments according to all aspects of the present invention enable the mobile devices 2-1 to 2-3 to gather a respective radio measurement. Those radio measurements may for instance be provided to server 3. The server 3 determines one or more radio nodes that enable one or more mobile devices a respective positioning, which is considered to be at least partially unexpected. For instance, identifier of the determined one or more radio nodes are stored by the server, e.g. in the database. Further, server 3 may for instance obtain (e.g. receive) a position estimate indicative of a position of a mobile device (e.g. one of the mobile devices 2-1 to 2-3). Based on such a position estimate, server 3 may for instance provide (e.g. output) at least a part of the stored database, e.g. a subset indicative of a respective area comprising information identifying one or more radio nodes located in the area, which enable a respective positioning, which is considered to be at least partially unexpected. Upon obtaining (e.g. receiving) of at least the part of the database, e.g. the respective mobile device may for instance store at least the part of the database, e.g. to be utilized in a positioning. For instance, the respective mobile device may for instance block a respective radio node as identified by the information of the database respectively the part of the database to be utilized in a positioning. Further, e.g. server 3 may for instance provide the database, additionally or alternatively to providing the database or a part of it to at least one of the mobile devices 2-1 to 2-3, to a location-based service, e.g. provided by another server or server cloud (not shown in FIG. 1).

In this way, e.g. a respective mobile device of the mobile device 2-1 to 2-3, and/or a location-based service can utilize at least the part of the information identifying one or more radio nodes, e.g. located in a certain area, which enable a respective positioning, which is considered to be at least partially unexpected, in a positioning. For instance, spoofed BLE beacons (e.g. radio node 5 of all radio nodes 4-1 to 4-5 and 5) may for instance be identified and e.g. blocked so that the respective blocked BLE beacon(s) may for instance be not considered for determining (e.g. estimating) the positon of e.g. a respective mobile device of the mobile devices 2-1 to 2-3, e.g. determined by the respective mobile device and/or determined by a location-based service.

FIG. 2a is a flowchart 200a showing an example embodiment of a method according to the first exemplary aspect of the present invention. This flowchart 200a may for instance be performed by a server or a server cloud, e.g. server 3 of FIG. 1.

In a first step 201, one or more pieces of radio measurements are obtained. The one or more pieces of radio measurements may for instance be obtained by receiving the one or more pieces of radio measurements, e.g. from one or more mobile devices (e.g. mobile device 2-1 to 2-3 of FIG. 1). Also, one or more pieces of radio measurements may for instance be obtained from other sources, e.g. other positioning servers (not shown in FIG. 1), or other electronic devices, such as IoT-devices, portable navigation devices, smartwatches, to name but a few non-limiting examples. The one or more pieces of radio measurements may for instance be received directly e.g. from the mobile devices, or alternatively, from entities that are different e.g. from the mobile devices, and which relay the one or more pieces of radio measurements to the server.

A second step 202 comprises the step 202-1. Optionally, the step 202 may for instance further comprise at least one of the steps 202-2, 202-3, and 202-4.

In the step 202-1, one or more radio nodes that enable one or more mobile devices a respective positioning, which is considered to be at least partially unexpected are determined. These one or more radio nodes may for instance be determined at least partially based on the one or more pieces of radio measurements that are obtained in step 201.

In an optional step 202-2, one or more identifiers, and additionally one or more received signal strength values comprised or represented by the one or more pieces of radio measurements are compared to respective comparison values comprised by or associated with a radio map. Optional step 202-2 may for instance be performed and/or controlled in conjunction with the performing and/or controlling of step 202-1. For instance, step 202-1 may comprise the optional step 202-2.

In an optional step 202-3, one or more affected radio nodes being associated with differing values between a respective radio measurement of the one or more pieces of radio measurements and the corresponding comparison values as one or more affected radio nodes enabling positioning being considered to be at least partially unexpected are determined. Optional step 202-3 may for instance be performed and/or controlled in conjunction with the performing and/or controlling of step 202-1. For instance, step 202-1 may comprise the optional step 202-3.

In an optional step 202-4, one or more areas in which the one or more affected radio nodes are located, are determined. Optional step 202-2 may for instance be performed and/or controlled in conjunction with the performing and/or controlling of step 202-1. For instance, step 202-1 may comprise the optional step 202-4.

In a third step 203, a database comprising information identifying the determined one or more radio nodes is maintained. The database comprises identifying information indicative of one or more radio nodes and/or or one or more areas within which the one or more (affected) radio nodes are located (see step 202). The database may for instance be stored in a memory. The memory may for instance be comprised by a server or a server cloud (e.g. server 3 of FIG. 1), or alternatively, the memory may for instance be connectable to the server or the server cloud. The database may for instance be utilized by at least one of a plurality of mobile devices (e.g. at least one of the mobile device 2-1 to 2-3 of FIG. 1) when performing positioning since the identifying information of the database are indicative of one or more radio nodes and/or of one or more areas comprising radio nodes enabling positioning that is considered to be at least partially unexpected. It will be understood that prior to such a utilization, e.g. at least one of such mobile devices may for instance require to obtain at least a part of the maintained database (e.g. see step 302 of flowchart 300a of FIG. 3a). Thus, a positioning utilizing such radio nodes (enabling positioning that is considered to be at least partially unexpected) can lead to e.g. spoofed, and/or fraudulent results. For instance, to prevent this from happening, the one or more radio nodes and/or the one or more areas within which the one or more radio nodes are located of the identifying information of the database may for instance be e.g. blocked from being utilizing when performing positioning.

In an optional fourth step 204, the database is updated further based on the determined one or more affected radio nodes (see step 202-3) and/or on the determined one or more areas. The database may for instance be updated, e.g. based on the one or more pieces of radio measurements that are obtained in step 201. It will be understood that in case the updating is performed and/or controlled, this may for instance require that the database is available (e.g. stored in a memory comprised by or connectable to the apparatus performing and/or controlling the flowchart 200a).

In an optional fifth step 205, at least a part of the database is provided to at least one location-based service. In an optional sixth step 206, at least a part of the database is provided to at least one mobile device for usage in a positioning. At least a part of the database (e.g. a subset of information comprised or represented by the database) may for instance be provided to at least one of a plurality of mobile devices (e.g. at least one of the mobile device 2-1 to 2-3 of FIG. 1), and/or to a location-based service. At least a part of the database may for instance be provided, e.g. by sending at least the part of the database, e.g. via communication interface (e.g. communication interface(s) 450 of apparatus 400 of FIG. 4).

Figure 2B:
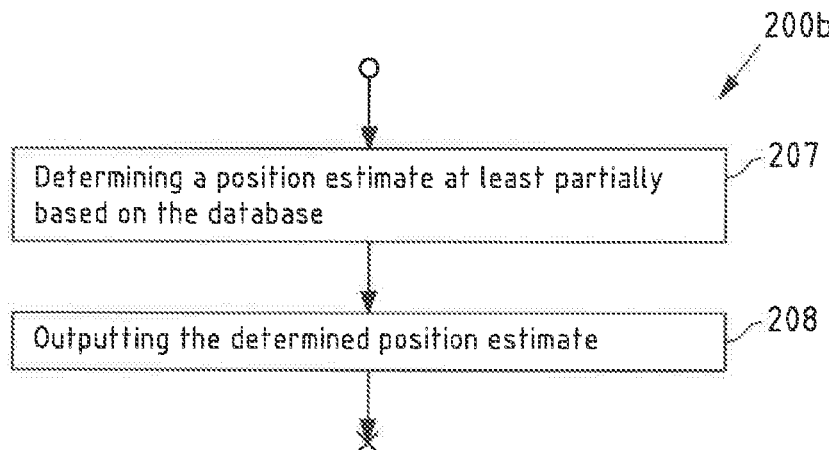

FIG. 2b is a flowchart 200b showing an example embodiment of a method according to the first exemplary aspect of the present invention. This flowchart 200b may for instance be performed by a server or a server cloud, e.g. server 3 of FIG. 1. The flowchart 200b may for instance be performed in addition to the flowchart 200a of FIG. 2a. The further steps 207 and/or 208 may for instance be performed in parallel to or after step 203 of flowchart 200a of FIG. 2a.

In a step 207, a position estimate is determined at least partially based on the database. The position estimate may for instance be determined at least partially based on the one or more pieces of radio measurements that are obtained in step 201 of flowchart 200a of FIG. 2a.

In a step 208, the determined position estimate is output. The position estimate determined in step 207 may for instance be output, e.g. to at least one of a plurality of mobile devices (e.g. at least one of the mobile device 2-1 to 2-3 of FIG. 1). For instance, prior to performing and/or controlling the step 207, e.g. a positioning request indicative of requesting a position estimate to be determined to represent a current position of a respective mobile device (e.g. at least one of the mobile device 2-1 to 2-3 of FIG. 1) may for instance be obtained (e.g. received). Then, e.g. the determined position estimate may for instance be output (e.g. send) to the respective mobile device from which such a positioning request was obtained.

Figure 3A:
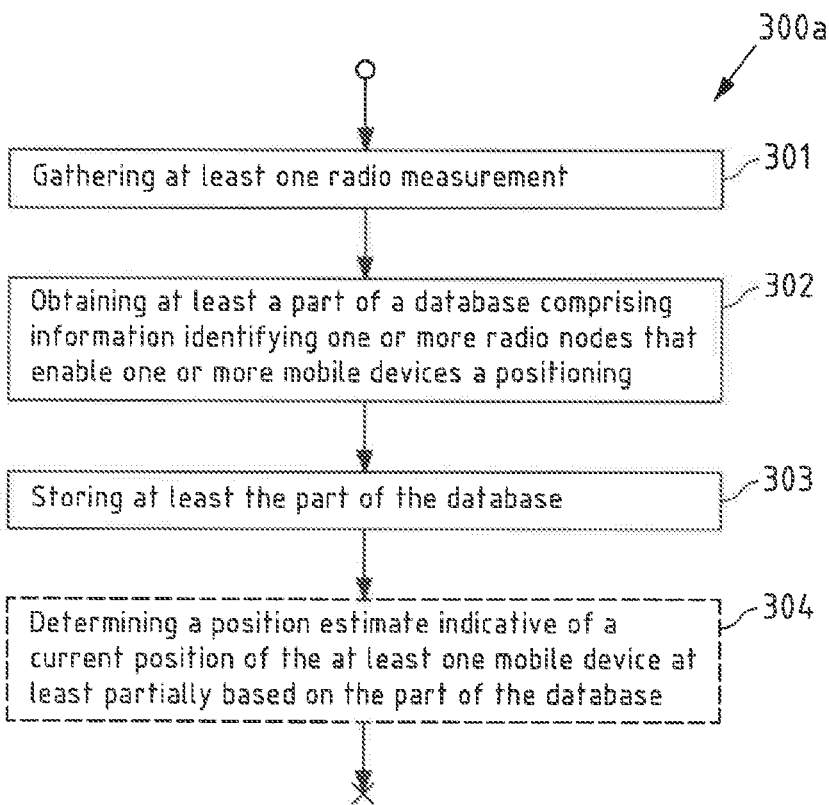
FIG. 3a is a flowchart illustrating an exemplary embodiment of a method according to the second exemplary aspect of the present invention.

FIG. 3a is a flowchart 300a showing an example embodiment of a method according to the second exemplary aspect of the present invention. This flowchart 300a may for instance be performed by a mobile device, e.g. a mobile terminal. This flowchart 300a may for instance be performed by at least one of the mobile devices 2-1 to 2-3 of FIG. 1.

In an optional first step 301, at least one radio measurement is gathered. The at least one radio measurement may for instance be gathered by measuring the at least one radio measurement, e.g. with sensor(s) 570 in case flowchart 300a is performed and/or controlled by apparatus 500 of FIG. 5.

In a second step 302, at least a part of a database comprising information identifying one or more radio nodes that enable one or more mobile devices a positioning is obtained. At least the part of the database may for instance be obtained by receiving at least the part of the database, e.g. from a server or a server cloud (e.g. server 3 of FIG. 1). At least a part of the database may for instance be received directly e.g. from the server, or alternatively, from an entity that is different e.g. from the server, and which relays at least a part of the database to the mobile device.

In a third step 303, at least the part of the database is stored, e.g. for a usage in a positioning, such as a determining of a position estimate (see step 304). At least a part of the database may for instance be stored, e.g. in a memory that is locally comprised by the mobile device, or that is connectable to the mobile device. Such a memory that is locally comprised by the mobile device may for instance be data memory 540 in case flowchart 300*a* is performed and/or controlled by apparatus 500 of FIG. 5.

In an optional fourth step 304, a position estimate indicative of a current position of the at least one mobile device is determined at least partially based on the part of the database. The position estimate may for instance be determined at least partially based on at least the part of the database that is stored (see step 303). Prior to the determining of the position estimate in the optional step 304, at least one radio measurement may for instance be gathered (see optional step 301). It will be understood that the optional step 301 does not necessarily need to be performed and/or controlled prior to step 302. The optional step 301 may for instance also be performed in parallel to, or after any of the steps 302 and 303 of flowchart 300*a* of FIG. 3*a*.

Figure 3B:
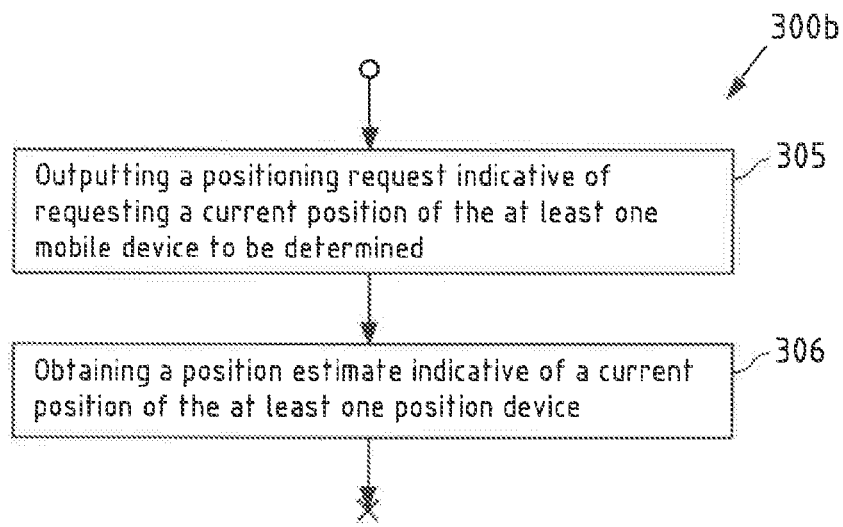

FIG. 3*b* is a flowchart 300*b* showing an example embodiment of a method according to the second exemplary aspect of the present invention. This flowchart 300*b* may for instance be performed by a mobile device, e.g. a mobile terminal. This flowchart 300*b* may for instance be performed by at least one of the mobile devices 2-1 to 2-3 of FIG. 1. The flowchart 300*b* may for instance be performed in addition to the flowchart 300*a* of FIG. 3*a*. Any of the further steps 305 and 306 may for instance be performed in parallel or before or after any of the steps 301 to 304 of flowchart 300*a* of FIG. 3*a*.

In a step 305, a positioning request indicative of requesting a current position of the at least one mobile device to be determined is output. For instance, the mobile device may for instance intend to determine (e.g. trigger a determination) of the position estimate. For instance, based on a gathered radio measurement (e.g. a fingerprint information (e.g. a radio fingerprint observation report)) it may for instance be enabled to determine the position estimate. The mobile device may for instance trigger e.g. a positioning server to perform and/or control the determination of the position estimate. For this, e.g. the positioning request is output, e.g. by sending the positioning request to such a positioning server, e.g. to a server or a server cloud (e.g. server 3 of FIG. 1).

In a step 306, a position estimate indicative of a current position of the at least one position device is obtained. Then, e.g. in response to the output position estimate of step 305, the determined position estimate is obtained, e.g. by receiving the position estimate, e.g. from such a positioning server, e.g. to a server or a server cloud (e.g. server 3 of FIG. 1).

Figure 3C:
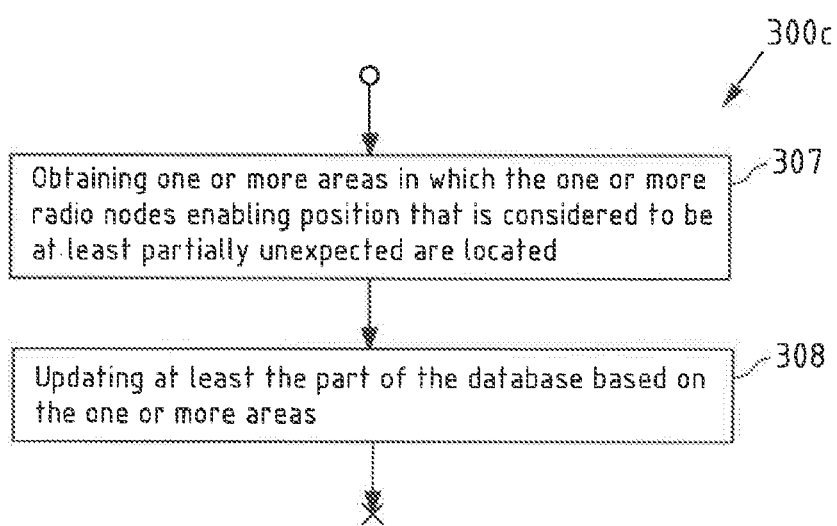

FIG. 3*c* is a flowchart 300*c* showing an example embodiment of a method according to the second exemplary aspect of the present invention. This flowchart 300*c* may for instance be performed by a mobile device, e.g. a mobile terminal. This flowchart 300*c* may for instance be performed by at least one of the mobile devices 2-1 to 2-3 of FIG. 1. The flowchart 300*c* may for instance be performed in addition to the flowchart 300*a* of FIG. 3*a*, and/or further, in addition to flowchart 300*b* of FIG. 3*b*. Any of the further steps 307 and 308 may for instance be performed in parallel or after step 303 of flowchart 300*a* of FIG. 3*a*.

In a step 307, one or more areas in which the one or more radio nodes enabling position that is considered to be at least partially unexpected are located are obtained. For instance, only a part of a database stored at a server or server cloud (see step 203 of flowchart 200*a* of FIG. 2*a*) performing and/or controlling the method according to the first exemplary aspect of the present invention may be obtained, e.g. by receiving a subset of this database comprising the one or more areas by the mobile device.

In a step 308, at least the part of the database is updated based on the one or more areas. For instance, based on the obtained one or more areas of step 307, a locally maintained (e.g. stored) database (see step 303 of flowchart 300*a* of FIG. 3*a*) is updated, e.g. by adding new information and/or cleaning outdated information, to name but a few non-limiting examples.

Figure 4:
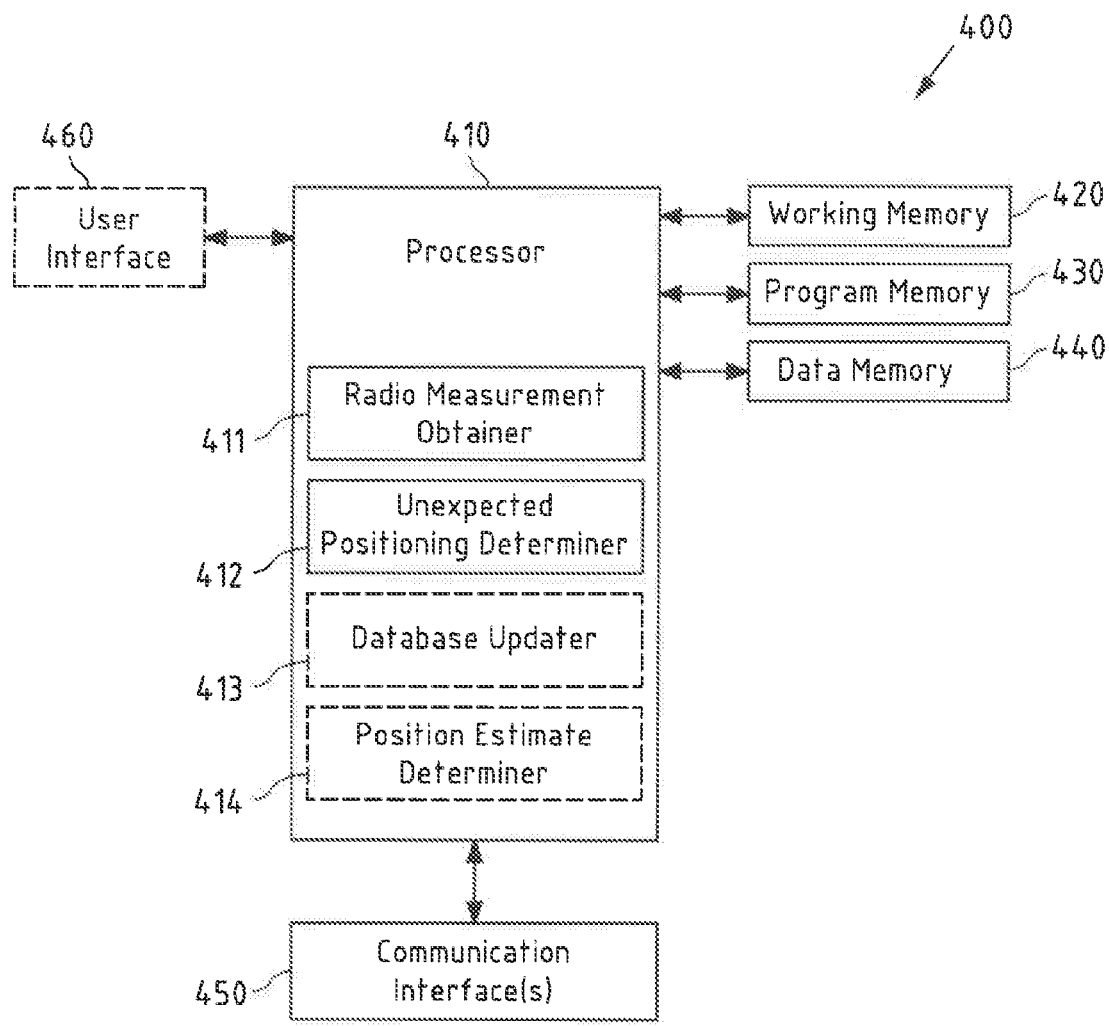
FIG. 4 is a block diagram of an exemplary embodiment of an apparatus according to the first exemplary aspect of the present invention.

FIG. 4 is a schematic block diagram of an apparatus 400 according to an exemplary aspect of the present invention, which may for instance represent the server 3 of FIG. 1.

Apparatus 400 comprises a processor 410, working memory 420, program memory 430, data memory 440, communication interface(s) 450, and an optional user interface 460.

Apparatus 400 may for instance be configured to perform and/or control or comprise respective means (at least one of 410 to 460) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention of the present invention.

Processor 410 may for instance comprise a radio measurement obtainer 411 as a functional and/or structural unit. Radio measurement obtainer 411 may for instance be configured to obtain one or more pieces of radio measurements (see step 201 of FIG. 2*a*).

Processor 410 may for instance comprise an unexpected positioning determiner 412 as a functional and/or structural unit. Unexpected positioning determiner 412 may for instance be configured to determine one or more radio nodes that enable one or more mobile devices a respective positioning, which is considered to be at least partially unexpected (see step 202-1 of FIG. 2*a*), compare one or more identifiers, and additionally one or more received signal strength values comprised or represented by one or more pieces of radio measurements to respective comparison values comprised by or associated with a radio map (see step 202-2 of FIG. 2*a*), determine one or more affected radio nodes (see step 202-3 of FIG. 2*a*), determine one or more areas (see step 202-4 of FIG. 2*a*), or combination thereof.

Processor 410 may for instance comprise an optional database updater 413 as a functional and/or structural unit. Database updater 413 may for instance be configured to update a database (e.g. locally stored in data memory 440 of apparatus 400), or a part of it (see step 204 of FIG. 2*a*).

Processor 410 may for instance comprise an optional position estimate determiner 414 as a functional and/or structural unit. Position estimate determiner 414 may for instance be configured to determine a position estimate (see step 207 of FIG. 2*b*).

Processor 410 may for instance further control the memories 420 to 440, the communication interface(s) 450, and the optional user interface 460.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of radio measurements, one or more radio nodes that enable one or more mobile devices a respective positioning, which is considered to be at least partially unexpected (e.g. one or more identifiers of such radio nodes), one or more affected radio nodes (e.g. one or more identifiers of such radio nodes), one or more areas (e.g. one or more area identifiers), a database, or a part of it, or a combination thereof, to name but a few non-limiting examples.

Communication interface(s) 450 enable apparatus 400 to communicate with other entities, e.g. with at least one of the mobile devices 2-1 to 2-3, and/or with at least one of the radio nodes 4-1 to 4-5, 5 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Some or all of the components of the apparatus 400 may for instance be connected via a bus. Some or all of the components of the apparatus 400 may for instance be combined into one or more modules.

Figure 5:
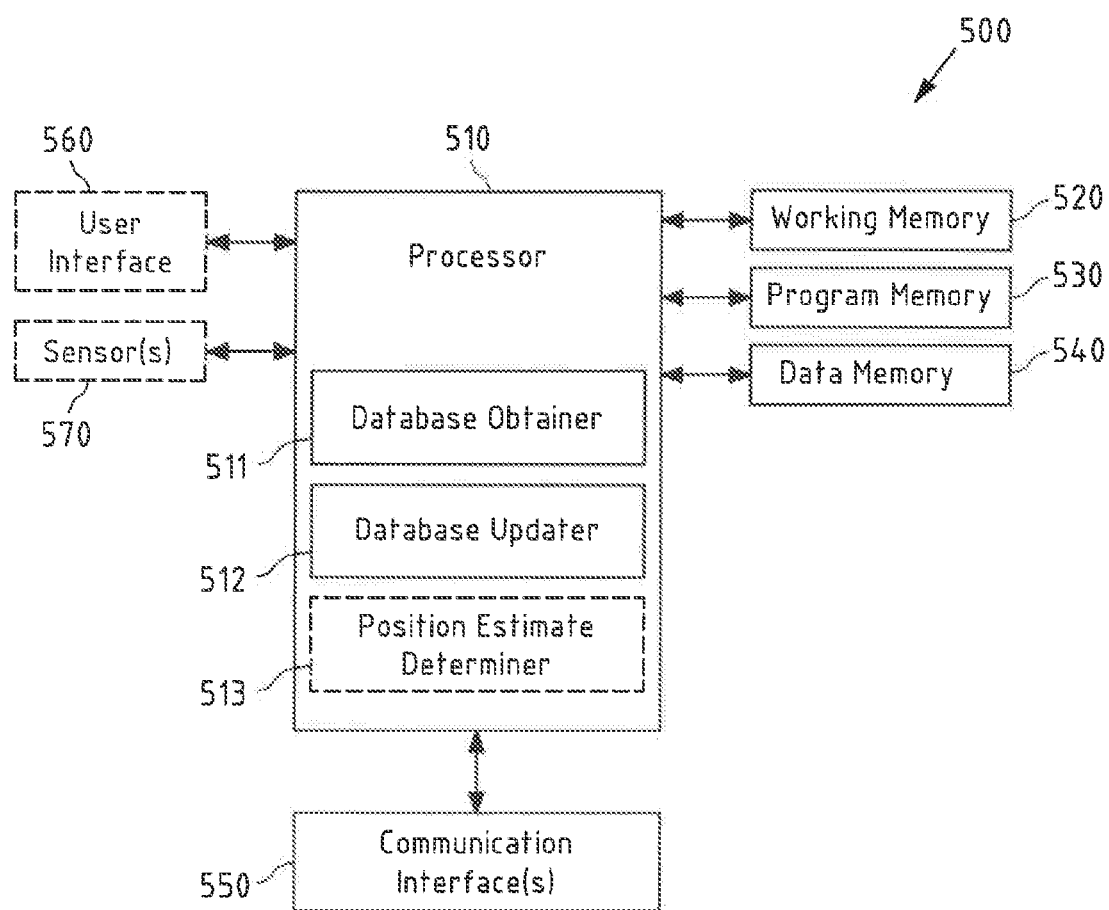
FIG. 5 is a block diagram of an exemplary embodiment of an apparatus according to the second exemplary aspect of the present invention.

FIG. 5 is a schematic block diagram of an apparatus 500 according to an exemplary aspect of the present invention, which may for instance represent at least one of the mobile devices 2-1 to 2-3 of FIG. 1.

Apparatus 500 comprises a processor 510, working memory 520, program memory 530, data memory 540, communication interface(s) 550, and an optional user interface 560 and an optional sensor(s) 570.

Apparatus 500 may for instance be configured to perform and/or control or comprise respective means (at least one of 510 to 570) for performing and/or controlling the method according to the second exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the second exemplary aspect of the invention of the present invention.

Processor 510 may for instance comprise a database obtainer 511 as a functional and/or structural unit. Database obtainer 511 may for instance be configured to obtain a database, or a part of it (see step 302 of FIG. 3a).

Processor 510 may for instance comprise an optional database updater 512 as a functional and/or structural unit. Database updater 512 may for instance be configured to update a database, or a part of it (see step 308 of FIG. 3c).

Processor 510 may for instance comprise an optional position estimate determiner 513 as a functional and/or structural unit. Position estimate determiner 513 may for instance be configured to determine a position estimate (see step 304 of FIG. 3a), e.g. based on at least one gathered radio measurement, or a part of it (see step 301 of FIG. 3a).

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the second exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store a database, or a part of it, one or more pieces of radio measurements, one or more position estimates, one or more areas, or a combination thereof, to name but a few non-limiting examples.

Communication interface(s) 550 enable apparatus 500 to communicate with other entities, e.g. with server 3 of FIG. 1. The communication interface(s) 550 may for instance comprise a wireless interface, e.g. a cellular radio communication interface and/or a WLAN interface) and/or wirebound interface, e.g. an IP-based interface, for instance to communicate with entities via the Internet. Communication interface(s) may enable apparatus 500 to communicate with other entities, for instance with radio nodes 4-1 to 4-5, and/or 5 of FIG. 1.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a barometric sensor, e.g. to gather pressure information.

Some or all of the components of the apparatus 500 may for instance be connected via a bus. Some or all of the components of the apparatus 500 may for instance be combined into one or more modules.

Figure 6:
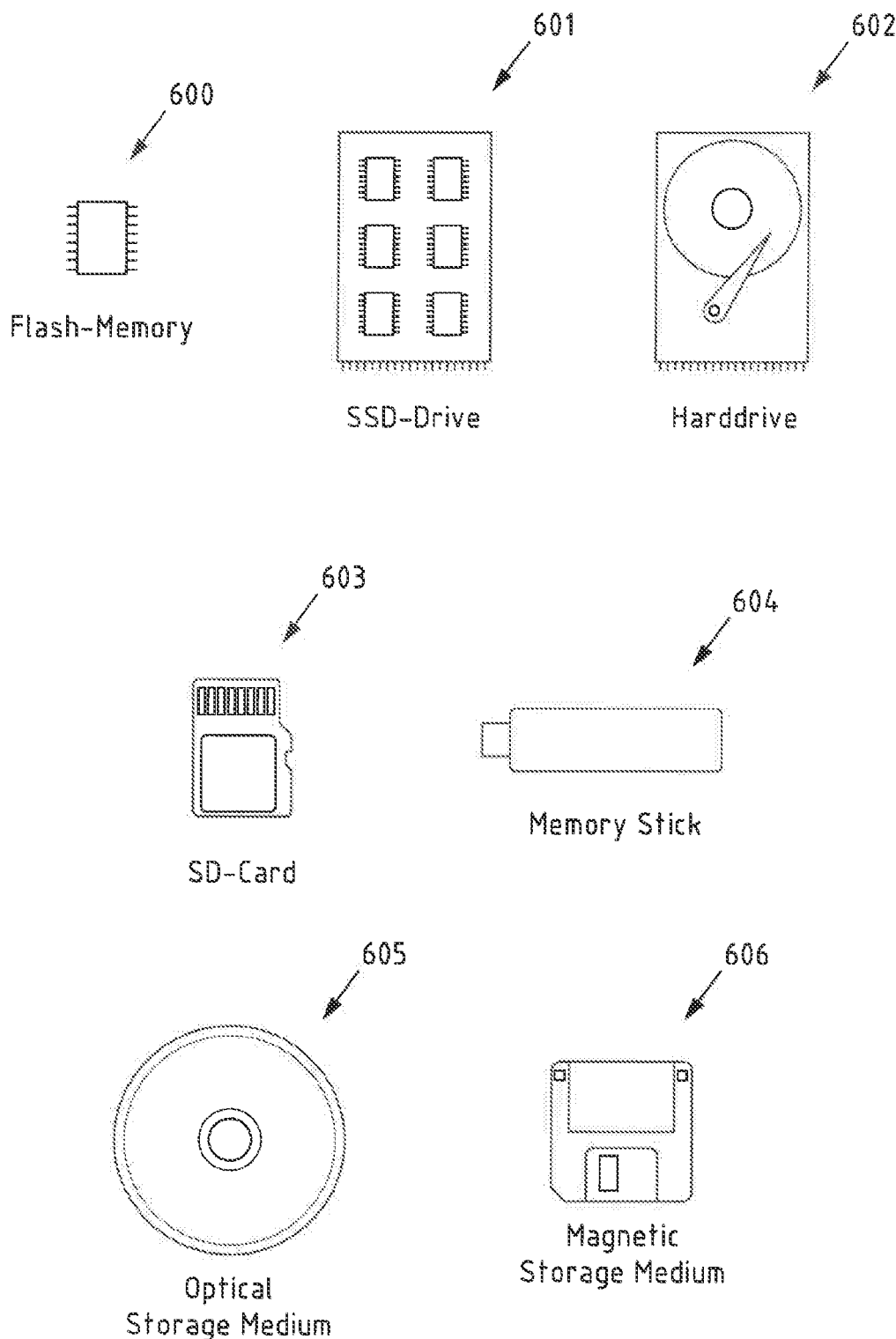
FIG. 6 is a schematic illustration of examples of tangible and non-transitory storage media according to the present invention.

FIG. 6 is a schematic illustration of examples of tangible and non-transitory computer-readable storage media according to the present invention that may for instance be used to implement one or more of the memories 420, 430 of FIG. 4 and/or memories 520, 530 of FIG. 5. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 310 of FIG. 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

The following embodiments shall also be considered to be disclosed:

Example embodiments according to all aspects of the present invention may for instance enable a method for
  A client sending radio measurements to a cloud positioning API;
  Positioning component in the cloud analyzing the measurements against the radio map;
  Storing suspicious access points to the database, e.g. there is a suspicion of jamming/spoofing/meaconing;
  Using the database information to support positioning online and offline.

Cloud-based positioning is quite like offline positioning—the most important difference is where the position estimate is computed. In online positioning the radio measurements are sent to the cloud and the server component in the cloud estimates position and sends the estimate back to the client or some other entity.

When estimating position, the positioning component can for instance consider at least some of techniques to determine, whether or not positioning to be performed and/or controlled based on one or more potentially affected radio nodes. For instance, the positioning request may for instance contain suspicious elements (e.g. one or more identifiers of affected radio nodes). If so, the information about area/radio nodes/frequency-bands may for instance be stored to the database (e.g. a locally stored database at the respective device). Then, this information stored in the database may for instance be utilized when positioning is performed and/or controlled, e.g. a position estimate is determined (e.g. estimated). For instance, the respective device may for instance perform and/or control one or more actions, e.g. listed in the following. The device(s) may take at least one of several actions. For instance, when the device again enters the area of influence, the device may take at least one of the following actions:
  The sensitivity of spoofing/meaconing detection can be increased. This will increase the probability of detecting a spoofing attempt. This will also increase the rate of false positives, but this is acceptable under risky conditions.
  Block affected radio transmitters, radio types and radio bands from positioning.
  Trust more on non-spoofable methods such as inertial and magnetic sensors.

It is mentioned that in some case the device(s) might also have a local spoofing database, wherein such a local database may for instance have the equal features as described with the database comprising aggregated spoofing information. In such a case, the device(s) may for example selectively replace records in the local database by comparing timestamps—newer data replaces old data.

The most important novelty of this approach is that this does not require any changes to the devices, e.g. this is a totally backwards compatible approach. In principle, this learning scheme can be implemented behind any cloud positioning API today.

Example embodiments according to all aspects of the present invention enable to increase the amount of data that can be harvested by orders of magnitude by utilizing the above disclosed scheme of learning suspicious area/radio nodes/frequency bands e.g. via cloud API positioning requests.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, performed by at least one apparatus, comprising:
   obtaining one or more pieces of radio measurements, wherein a respective radio measurement of the one or more pieces of radio measurements is indicative of one or more identifiers of one or more radio nodes that are observable at a certain position;
   determining a subset of the one or more radio nodes that enables one or more mobile devices a respective positioning based at least partially on the one or more pieces of radio measurements and a radio map, the radio map representing a radio environment, determining of the subset of the one or more radio nodes that enables the one or more mobile devices the respective positioning comprising:
      comparing the one or more identifiers and one or more values to respective comparison values comprised by or associated with the radio map, the one or more values comprised or represented by the one or more pieces of radio measurements, and
      determining one or more affected radio nodes being associated with differing values between a respective radio measurement of the one or more pieces of radio measurements and the corresponding comparison values as the subset of the one or more radio nodes enabling positioning, wherein said positioning enabled by the subset of the one or more radio nodes is considered to be at least partially unexpected; and
   maintaining a database comprising information identifying the determined subset of the one or more radio nodes.

2. The method according to claim 1, wherein a respective radio measurement of the one or more pieces of radio measurements comprises one or more identifiers indicative of one or more radio nodes that are observable at the certain position, and optionally one or more received signal strength values determined based on radio signals sent by the one or more radio nodes.

3. The method according to claim 1, wherein the one or more values comprised or represented by the one or more pieces of radio measurements comprise one or more received signal strength values; and
   maintaining the database comprises updating the database such that the database comprises an indication of the determined one or more affected radio nodes.

4. The method according to claim 1, further comprising:
   determining one or more areas in which the one or more affected radio nodes are located, wherein the one or more areas are determined at least partially based on the one or more affected radio nodes; and
   updating the database based on the determined one or more areas.

5. The method according to claim 1, further comprising:
   determining a position estimate at least partially based on the database; and
   outputting the determined position estimate.

6. The method according to claim 1, further comprising:
providing at least a part of the database to at least one position-based service.

7. The method according to claim 1, further comprising:
providing at least a part of the database to at least one mobile device for usage in an offline positioning performed and/or controlled by the at least one mobile device.

8. The method of claim 1, wherein the radio map comprises at least one radio model, the radio model providing a description of a coverage area of a corresponding radio node of the one or more radio nodes.

9. The method of claim 1, wherein the radio map comprises at least one radio model, the radio model being a radio image representing an expected radio signal strength field of a radio signal transmitted by the corresponding radio node.

10. A method, performed by at least one mobile device comprising a communication interface and memory, comprising:
receiving, via the communication interface, at least a part of a database comprising information identifying one or more radio nodes that enable one or more mobile devices a positioning and at least a part of a radio map, the radio map representing a radio environment, wherein:
the one or more radio nodes (a) enable the at least one mobile device a respective positioning and (b) comprise one or more affected nodes,
the positioning that is enabled by radio signals sent by each radio node of the one or more affected radio nodes is considered to be at least partially unexpected, and
the one or more affected radio nodes were identified as having observed signal strength values that differed from respective comparison values comprised by or associated with the radio map;
storing at least the part of the database in the memory;
obtaining one or more areas in which the one or more radio nodes enabling position that is considered to be at least partially unexpected are located; and
updating at least the part of the database based on the one or more areas.

11. The method according to claim 10, further comprising:
gathering at least one radio measurement indicative of one or more identifiers of one or more radio nodes that are observable at a certain position at which the at least one mobile device is located; and
determining a position estimate indicative of a current position of the at least one mobile device at least partially based on the part of the database.

12. The method according to claim 10, further comprising:
outputting a positioning request indicative of requesting a current position of the at least one mobile device to be determined; and
obtaining a position estimate indicative of a current position of the at least one position device.

13. The method of claim 10, wherein an area of the one or more areas is identifiable by a respective area identifier configured to enable determination of a size and a form of the area.

14. An apparatus comprising at least one processor and at least one memory including computer program code, the at least one memory and the computer program code configured to, with the at least one processor, cause said apparatus at least to:
obtain one or more pieces of radio measurements, wherein a respective radio measurement of the one or more pieces of radio measurements is indicative of one or more identifiers of one or more radio nodes that are observable at a certain position;
determine a subset of the one or more radio nodes that enables one or more mobile devices a respective positioning based at least partially on the one or more pieces of radio measurements and a radio map, the radio map representing a radio environment, determining of the subset of the one or more radio nodes that enables the one or more mobile devices the respective positioning comprising:
comparing the one or more identifiers and one or more values to respective comparison values comprised by or associated with the radio map, the one or more values comprised or represented by the one or more pieces of radio measurements, and
determining one or more affected radio nodes being associated with differing values between a respective radio measurement of the one or more pieces of radio measurements and the corresponding comparison values as the subset of the one or more radio nodes enabling positioning, wherein said positioning enabled by the subset of the one or more radio nodes is considered to be at least partially unexpected; and
maintain a database comprising information identifying the determined subset of the one or more radio nodes.

15. The apparatus according to claim 14, wherein a respective radio measurement of the one or more pieces of radio measurements comprises one or more identifiers indicative of the one or more radio nodes that are observable at the certain position, and optionally one or more received signal strength values determined based on radio signals sent by the one or more radio nodes.

16. The apparatus according to claim 14, wherein the one or more values comprised or represented by the one or more pieces of radio measurements comprise one or more received signal strength values; and
the at least one memory and the computer program code are further configured to, with the at least one processor, cause said apparatus to maintain the database by updating the database based on the determined one or more affected radio nodes.

17. The apparatus according to claim 14, wherein the at least one memory and the computer program code are further configured to, with the at least one processor, cause said apparatus to:
determine one or more areas in which the one or more affected radio nodes are located, wherein the one or more areas are determined at least partially based on the one or more affected radio nodes; and
update the database based on the determined one or more areas.

18. The apparatus according to claim 14, wherein the at least one memory and the computer program code are further configured to, with the at least one processor, cause said apparatus to:
determine a position estimate at least partially based on the database; and
output the determined position estimate.

19. The apparatus according to claim 14, wherein the at least one memory and the computer program code are further configured to, with the at least one processor, cause said apparatus to provide at least a part of the database to at least one position-based service.

20. The apparatus according to claim 14, wherein the at least one memory and the computer program code are further configured to, with the at least one processor, cause said apparatus to:

provide at least a part of the database to at least one mobile device for usage in an offline positioning performed and/or controlled by the at least one mobile device.

* * * * *